United States Patent
Garahi et al.

[11] Patent Number: 5,809,428
[45] Date of Patent: Sep. 15, 1998

[54] METHOD AND DEVICE FOR PROCESSING UNDELIVERED DATA MESSAGES IN A TWO-WAY WIRELESS COMMUNICATIONS SYSTEM

[75] Inventors: Masood Garahi, Madison; William D. Hays, Jackson; John J. Hale; Gregory J. Pinter, both of Brandon, all of Miss.

[73] Assignee: Mobile Telecommunication Technology, Jackson, Miss.

[21] Appl. No.: 687,034

[22] Filed: Jul. 25, 1996

[51] Int. Cl.$^6$ ............................................. H04B 7/00
[52] U.S. Cl. .................. 455/517; 455/412; 455/67.1; 455/522; 340/825.44
[58] Field of Search ..................... 455/517, 507, 455/508, 422, 412, 413, 435, 522, 67.1; 340/825.44, 311.1

[56] References Cited

U.S. PATENT DOCUMENTS

5,590,403  12/1996  Cameron et al. ..................... 455/51.2

*Primary Examiner*—Donnie L. Crosland
*Attorney, Agent, or Firm*—Finnegan, Henderson, Farabow, Garrett & Dunner, L.L.P.

[57] ABSTRACT

A network operations center transmits a data message to a wireless mobile unit and waits for a data acknowledgment message. If no acknowledgment is received within a specified time, the network operations center sends a probe message to attempt to locate the mobile unit and waits for a probe acknowledgment message. If still no acknowledgment, the network operations center marks the data message as undelivered and stores it for future delivery. If a mobile unit receives a probe message while its transmitter is powered off, it displays an indication to the subscriber that there is a message waiting to be delivered. The subscriber can then dial into the network operations center to retrieve the message. Or, when the transmitter of the mobile unit is powered back on, the mobile unit sends a registration message to the network operations center; and upon receiving the registration message, the network operations center automatically re-transmits the undelivered data message to the mobile unit.

10 Claims, 9 Drawing Sheets

METHOD AND DEVICE FOR PROCESSING UNDELIVERED DATA MESSAGES IN A TWO-WAY WIRELESS COMMUNICATIONS SYSTEM

BACKGROUND OF THE INVENTION

1. Field of the Invention

The present invention relates generally to methods and devices for two-way wireless communications. More particularly, the present invention relates to methods and devices for processing data messages between a network operations center and a mobile unit in a two-way wireless network.

2. Description of the Related Art

Portable wireless communication devices are gaining widespread popularity because they provide subscribers access to information while on the move. Conventional wireless communications networks are typically one-way paging systems wherein messages are transmitted from a central paging station to a personal pager.

Such conventional systems are one-way in the sense that the pager has no transmission capability. The pager can only receive messages from the central paging station and is, therefore, incapable of acknowledging the receipt of messages back to the central paging station. Because of this limitation, the central paging station has no way of knowing whether a message has been successfully delivered to the pager. The paging station simply transmits the page and assumes that the subscriber received it. There can be various reasons, however, why a message cannot be successfully delivered. For example, the pager may be outside the range of the paging station or, simply, turned off.

Two-way data messaging systems are different. They allow communication in both directions between a network operations center and a mobile unit. A two-way messaging system is described, for example, in the U.S. patent application Ser. No. 08/124,219, filed Sep. 21, 1993, the contents of which are incorporated herein by reference. That application describes that the mobile unit is capable of acknowledging that it accurately received a message sent from the network operations center. The acknowledgment, however, does not indicate whether it is acknowledging the receipt of a data message or a probe message (a message sent by the network operations center to locate a mobile unit). Thus, there is a need for methods and devices that allow two-way communications between a network operations center and a personal mobile unit such that successfully delivered data messages and probe messages from the network operations center can be distinctively acknowledged by the mobile unit. A need also exists to provide two-way communications between a network operations center and a personal mobile unit and have unsuccessfully delivered messages marked and stored for future delivery.

SUMMARY OF THE INVENTION

Accordingly, the present invention is directed to methods and devices that substantially obviate one or more of the problems due to limitations and disadvantages of the related art.

In a preferred embodiment, the present invention includes a network operations center for transmitting and receiving messages to and from a wireless mobile unit, comprising means for transmitting messages to the mobile unit; means for receiving acknowledgment messages from the mobile unit acknowledging receipt of the messages sent; means for determining whether a received acknowledgment message is an acknowledgment to a data message or an acknowledgment to a probe message; means for transmitting a probe message to the mobile unit if, after transmitting a data message to the mobile unit, no data acknowledgment message is received; means for marking a data message as undelivered and storing the undelivered data message if, after transmitting a probe message to the mobile unit, no probe acknowledgment message is received; means for receiving registration messages from the mobile unit; and means for automatically transmitting undelivered data messages to the mobile unit upon receiving a registration message from the mobile unit.

In another embodiment, the invention includes a wireless mobile unit for receiving and transmitting messages from and to a network operations center, comprising means for receiving messages from the network operations center; means for transmitting, upon receiving a data message, a data acknowledgment message to the network operations center acknowledging receipt of the data message; means for transmitting, upon receiving a probe message, a probe acknowledgment message to the network operations center acknowledging receipt of the probe message; means for powering off only the transmitter of the mobile unit; means for receiving and recognizing probe messages sent by the network operations center when the transmitter is powered off; means for displaying, upon receipt of a probe message when the transmitter is powered off, an indication that the network operations center has attempted delivery; means for determining, upon power restoration to the transmitter, whether a probe message has been received when the transmitter is powered off; and means for transmitting, upon power restoration to the transmitter, a registration message to the network operations center if a probe message has been received when the transmitter is powered off.

In yet another embodiment, the invention includes, in a two-way wireless communications system, a method of processing data messages that cannot be successfully transmitted from a network operations center to a wireless mobile unit, comprising the steps of transmitting messages from the network operations center to the mobile unit; receiving at the network operations center acknowledgment messages from the mobile unit acknowledging receipt of the messages sent by the network operations center; transmitting a probe message from the network operations center to the mobile unit if, after transmitting a data message to the mobile unit, no data acknowledgment message is received at the network operations center; marking at the network operations center a data message as undelivered if, after transmitting a probe message to the mobile unit, no probe acknowledgment message is received at the network operations center; storing at the network operations center the undelivered data message; and transmitting undelivered data messages from the network operations center to the mobile unit upon receiving at the network operations center a registration message from the mobile unit.

It is to be understood that both the foregoing general description and the following detailed description are exemplary and explanatory only and are not restrictive of the invention as claimed.

BRIEF DESCRIPTION OF THE DRAWINGS

The accompanying drawings are included to provide a further understanding of the invention and are incorporated in and constitute a part of this specification, illustrate a preferred embodiment of the invention, and, together with the description, serve to explain the principles of the invention.

In the drawings.

DETAILED DESCRIPTION OF THE INVENTION

Figure 1:
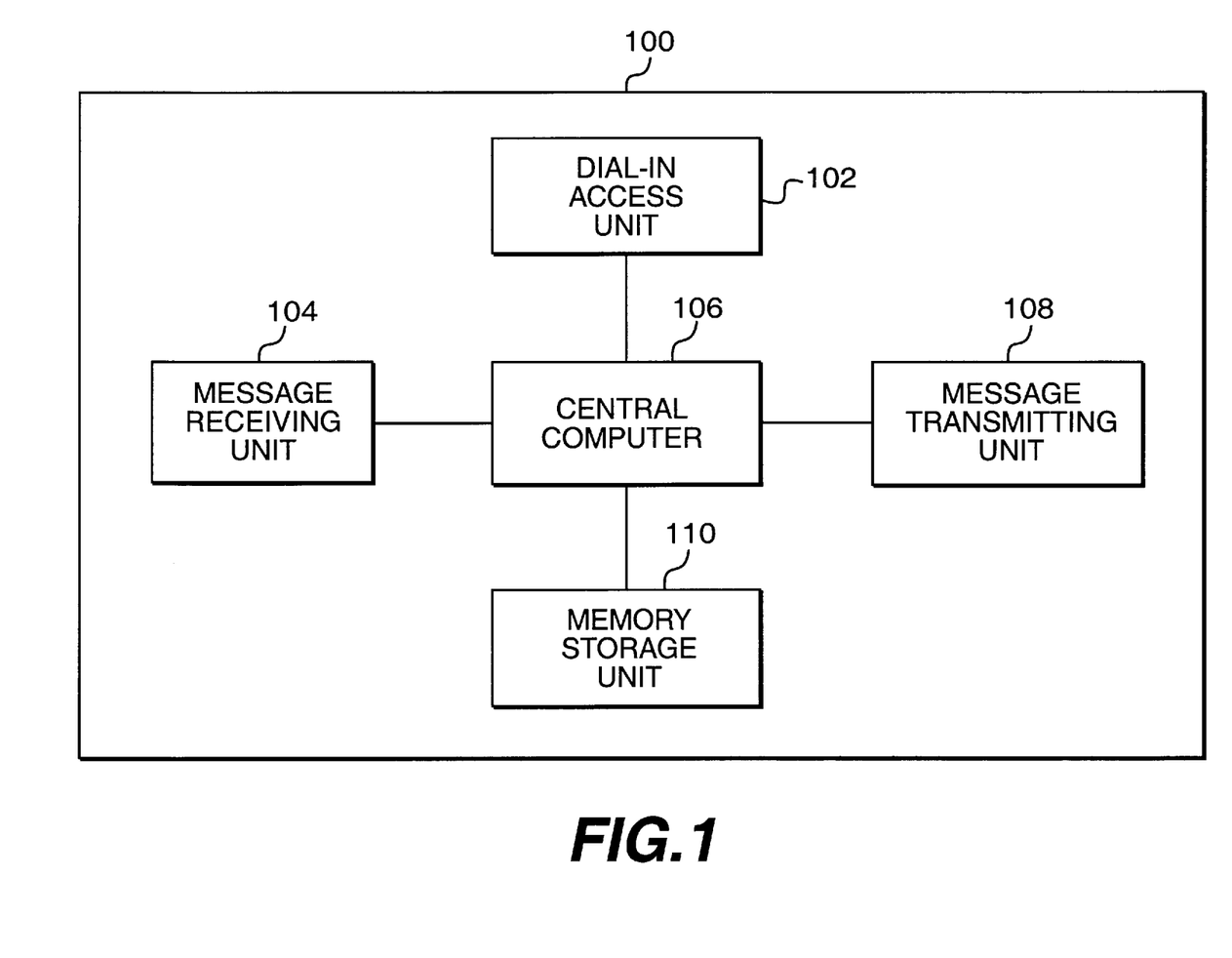
FIG. 1 illustrates a block diagram of a network operations center, in accordance with a preferred embodiment of the present invention.

FIG. 1 shows a block diagram of network operations center 100, in accordance with a preferred embodiment of the present invention. Network operations center 100 includes dial-in access unit 102, message receiving unit 104, central computer 106, message transmitting unit 108, and memory storage unit 110. Central computer 106 is connected to dial-in access unit 102, message receiving unit 104, message transmitting unit 108, and memory storage unit 110. The network operations center is more completely described in the incorporated U.S. patent application Ser. No. 08/124,219.

In a preferred embodiment of the invention, dial-in access unit 102 allows a subscriber or a caller to contact network operations center 100 via the telephone network. For example, a caller may dial-in to leave a message for the subscriber, and a subscriber may dial in to change subscription parameters or retrieve undelivered messages.

Message receiving unit 104 receives messages and forwards them to central computer 106. In accordance with the present invention, message receiving unit 104 receives at least three different types of messages: data messages, acknowledgment messages, and registration messages.

Message transmitting unit 108 transmits messages forwarded to it from central computer 106. In accordance with the present invention, message transmitting unit 108 transmits at least two different types of messages: data messages and probe messages.

Central computer 106 controls the operation of network operations center 100. In particular, central computer 106 preferably receives messages forwarded by message receiving unit 104, processes received messages, forwards received messages to memory storage unit 110, generates probe messages, forwards data messages waiting to be delivered in memory storage unit 110 to message transmitting unit 108, marks undelivered data messages, and stores undelivered data messages in memory storage unit 110 for future delivery. Central computer 106 is described in greater detail below in connection with FIG. 3.

Memory storage unit 110 preferably provides storage for received messages, control information, and undelivered messages.

Figure 2:
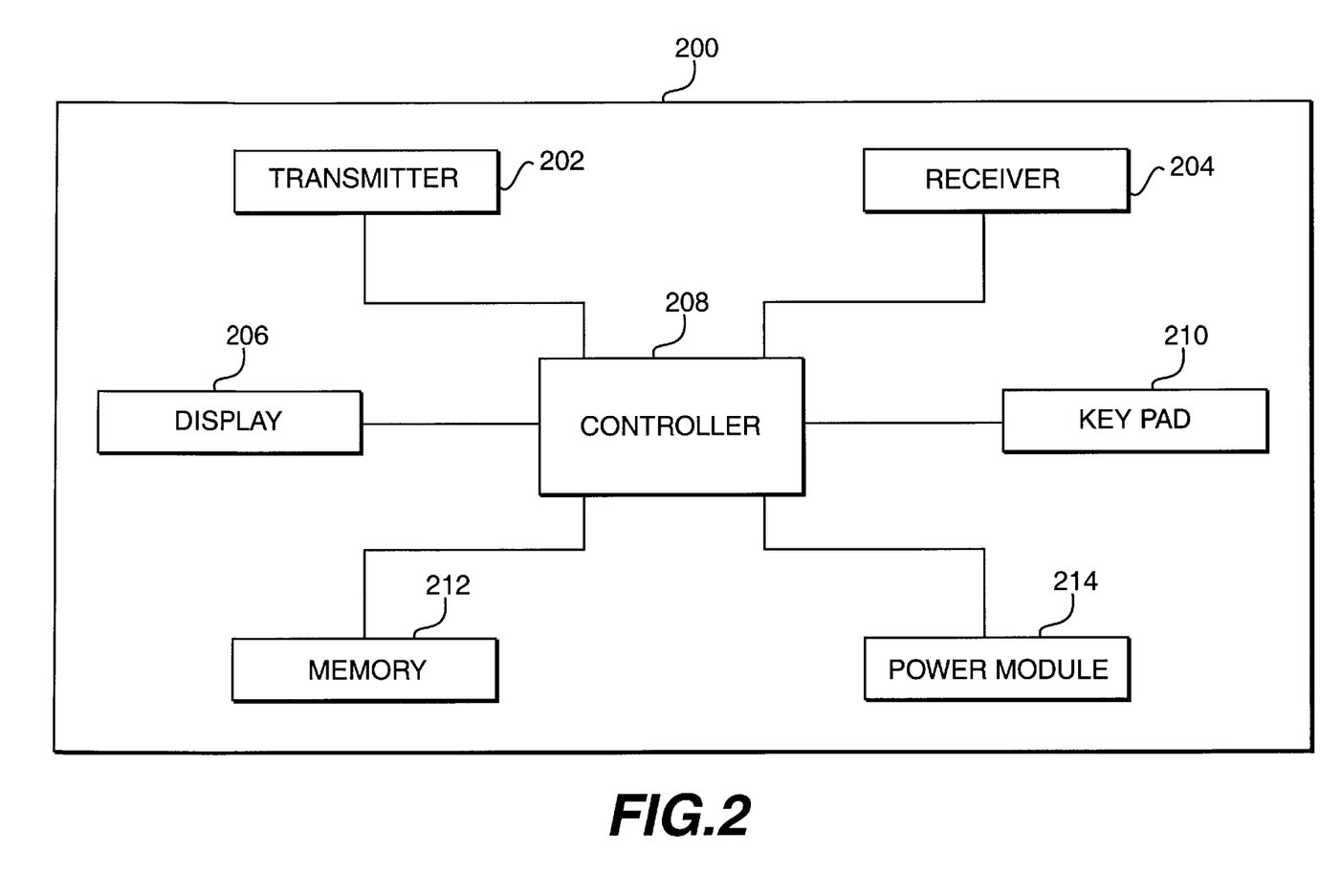
FIG. 2 illustrates a block diagram of a mobile unit used in a two-way wireless communications system, in accordance with a preferred embodiment of the present invention.

FIG. 2 shows a block diagram of a mobile unit 200, in accordance with a preferred embodiment of the present invention. Mobile unit 200 includes transmitter 202, receiver 204, display 206, controller 208, key pad 210, memory 212, and power module 214. Controller 208 is connected to transmitter 202, receiver 204, display 206, key pad 210, memory 212, and power module 214.

Transmitter 202 transmits messages forwarded to it from controller 208. Preferably, transmitter 202 transmits at least three different types of messages: data messages, acknowledgment messages, and registration messages. There are preferably two forms of acknowledgment messages: data acknowledgment messages generated by a mobile unit to acknowledge receipt of data messages and probe acknowledgment messages generated by a mobile unit to acknowledge receipt of probe messages (defined below) transmitted from a network operations center. A registration message is generally a message generated by a mobile unit to update its location to the network operations center.

Receiver 204 receives messages and forwards them to controller 208. Receiver 204 preferably receives at least two different types of messages: data messages and probe messages. A probe message, as described above, is generally a message generated by a network operations center to locate a mobile unit.

Controller 208 controls the operation of mobile unit 200. For example, controller 208 receives messages forwarded by receiver 204, processes received messages, forwards received messages to display 206 or memory 212, forwards messages entered by a subscriber through key pad 210 to transmitter 202, and controls power from power module 214 to transmitter 202, receiver 204, and mobile unit 200. Controller 208 also preferably generates acknowledgment and registration messages, as described in greater detail below in connection with FIG. 4.

A subscriber preferably enters messages and commands through key pad 210 and display 206 in accordance with conventional techniques. Display 206 also displays messages received from controller 208 and messages entered by a subscriber.

Memory 212 provides storage for received messages and control information.

Power module 214 supplies power to the various components of mobile unit 200. Power module 214 is described in greater detail below in connection with FIG. 5.

Figure 3:
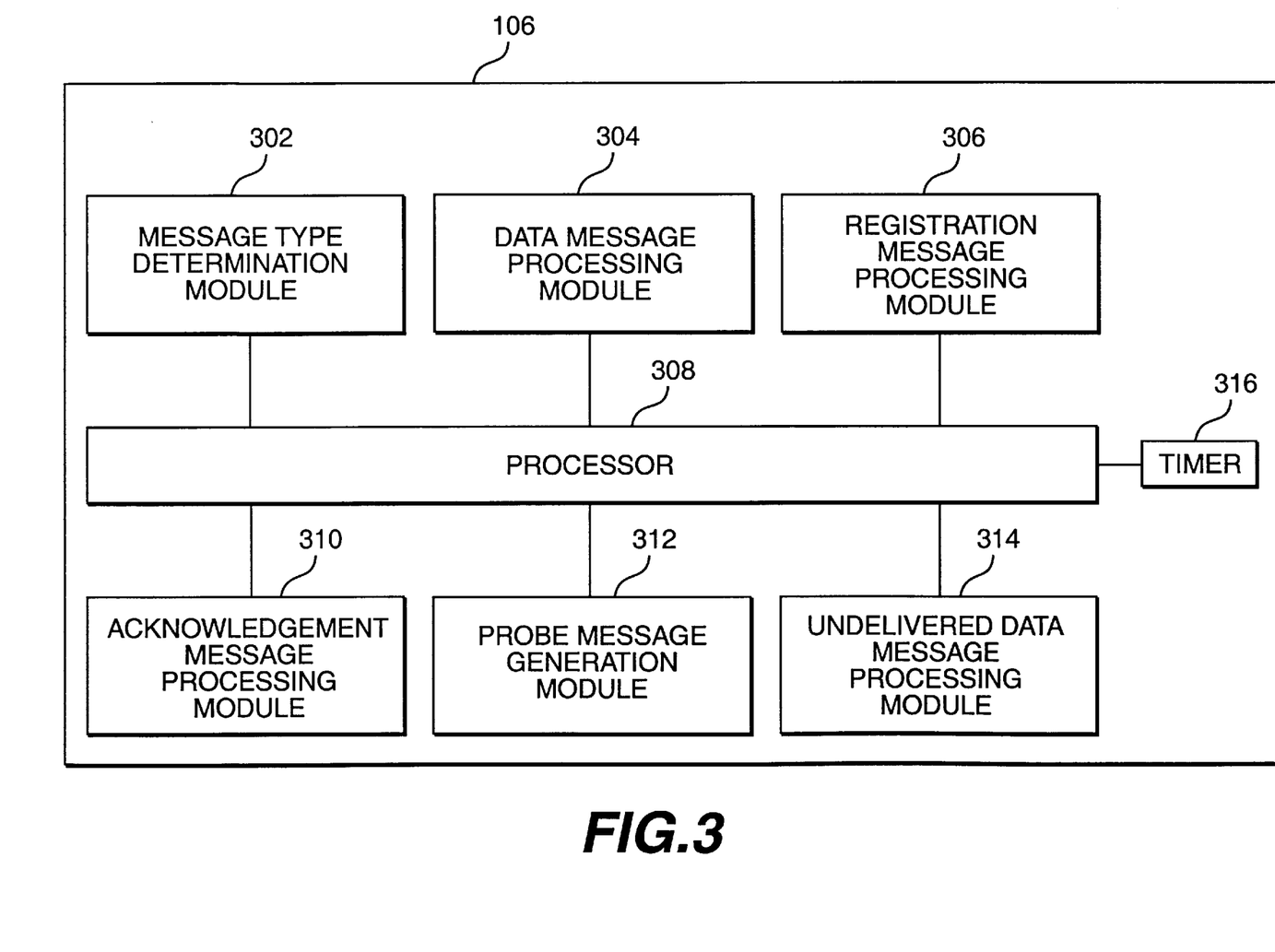
FIG. 3 illustrates a block diagram of a central computer of the network operations center shown in FIG. 1, in accordance with a preferred embodiment of the present invention.

FIG. 3 shows a block diagram of central computer 106 of network operations center 100, in accordance with a preferred embodiment of the present invention. Central computer 106 includes message type determination (MTD) module 302, data message processing (DMP) module 304, registration message processing (RMP) module 306, processor 308, acknowledgment message processing (AMP)

module 310, probe message generation (PMG) module 312, and undelivered data message processing (UDMP) module 314, and timer 316.

MTD module 302 determines whether the message received by message receiving unit 104 is a data message, an acknowledgment message, or a registration message. As message receiving unit 104 receives an incoming message, it forwards the message to MTD module 302. If MTD module 302 identifies the incoming message as a data message, then it forwards the message to DMP module 304. If MTD module 302 identifies the incoming message as an acknowledgment message, then it forwards the message to AMP module 310. If MTD module 302 identifies the incoming message as a registration message, then it forwards the message to RMP module 306.

As DMP module 304 receives a data message from MTD module 302, it forwards the message to message transmitting unit 108 to be delivered to the destination mobile unit and starts an internal timer 316 for receiving acknowledgment of receipt by the destination mobile unit within a predetermined time period. If timer 316 expires before a data acknowledgment message is received, then DMP module 304 requests PMG module 312 to generate a probe message.

As AMP module 310 receives an acknowledgment message from MTD module 302, it first determines whether the message is a data acknowledgment message or a probe acknowledgment message. If it is the former, then AMP module 310 indicates to DMP module 304 to forward to message transmitting unit 108 the next data message in memory storage unit 110 waiting to be delivered to that subscriber. If it is the latter, then AMP module 310 updates in memory storage unit 110 the location of mobile unit 200 and indicates to DMP module 304 to re-send the last data message to message transmitting unit 108. The location information comes from the location of the base receiver that relayed the probe acknowledgment message from the mobile unit to the network operations center as described in the incorporated U.S. patent application Ser. No. 08/124,219.

As PMG module 312 receives a request from DMP module 304 to generate a probe message, it creates a probe message, forwards it to message transmitting unit 108, and starts timer 316 for receiving a probe acknowledgment message within a predetermined time period. If timer 316 expires before a probe acknowledgment message is received, then PMG module 312 requests UDMP module 314 to mark the last data message transmitted as undelivered.

Upon receiving a request from PMG module 312 to mark a data message as undelivered, UDMP module 314 marks the message accordingly and stores it in memory storage unit 110 for future delivery.

As RMP module 306 receives a registration message from MTD module 302, it updates in memory storage unit 110 the location of mobile unit 200 and forwards to message transmitting unit 108 any undelivered data messages stored in memory storage unit 110.

In a preferred embodiment, modules 302, 304, 306, 310, 312, and 314 comprise software or microcode and any hardware necessary to effect the execution of that software or microcode in accordance with conventional techniques. In an alternative embodiment, modules 302, 304, 306, 310, 312, and 314 can be implemented in electronic logic circuitry. Processor 308 is preferably any processor capable of executing the software or microcode of the foregoing modules and performing the processing functions described herein. Timer 316 is preferably any hardware or software timer capable of performing the timing functions described herein.

Figure 4:
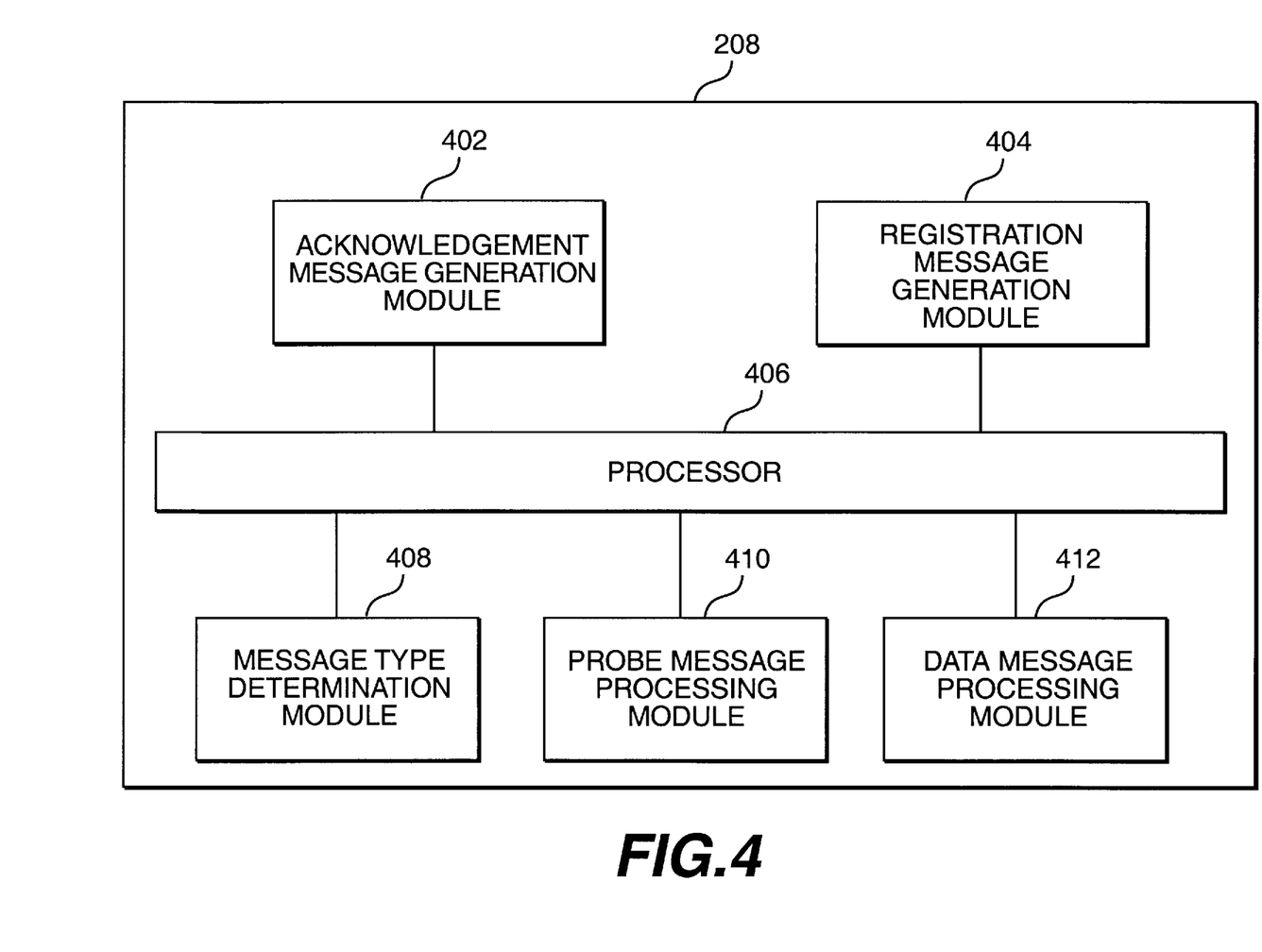
FIG. 4 illustrates a block diagram of a controller of the mobile unit shown in FIG. 2, in accordance with a preferred embodiment of the present invention.

FIG. 4 shows a block diagram of controller 208 of mobile unit 200, in accordance with a preferred embodiment of the present invention. Preferably, controller 208 includes acknowledgment message generation (AMG) module 402, registration message generation (RMG) module 404, processor 406, message type determination (MTD) module 408, probe message processing (PMP) module 410, and data message processing (DMP) module 412.

MTD module 408 determines whether the message received by receiver 204 is a data message or a probe message. As receiver 204 receives an incoming message, it forwards the message to MTD module 408. If MTD module 408 identifies the incoming message as a data message, then it forwards the message to DMP module 412 and informs AMG module 402 to generate a data acknowledgment message. If MTD module 408 identifies the incoming message as a probe message, then it forwards the message to PMP module 410.

As DMP module 412 receives a data message from MTD module 408, it sends the message to display 206 to be viewed by a subscriber. If the subscriber chooses to save the message, then DMP module 412 also stores the received data message in memory 212.

As PMP module 410 receives a probe message from MTD module 408, it first determines whether transmitter 202 is powered on. If transmitter 202 is on, then PMP module 410 requests AMG module 402 to generate a probe acknowledgment message. If transmitter 202 is off, then PMP module 410 transfers to display 206 a message indicating to the subscriber that a message awaits and stores in memory 212 control information indicating that a probe message has been received when transmitter 202 is powered off.

Upon receiving from MTD module 408 or PMP module 410 a request to generate a data acknowledgment message or a probe acknowledgment message, respectively, AMG module 402 creates the appropriate acknowledgment message and forwards it to transmitter 202.

RMG module 404 generates registration messages. In a preferred embodiment of the present invention, as transmitter 202 is powered on, RMG module 404 checks memory 212 for an indication that a probe message has been received when transmitter 202 is off. If such an indication exits, then RMG module 404 creates a registration message and forwards it to transmitter 202.

In a preferred embodiment, modules 402, 404, 408, 410, and 412 comprise software or microcode and any hardware necessary to effect the execution of that software or microcode in accordance with conventional techniques. In an alternative embodiment, modules 402, 404, 408, 410, and 412 can be implemented in electronic logic circuitry. Processor 406 is preferably any processor capable of executing the foregoing software or microcode and performing the processing functions described herein.

Figure 5:
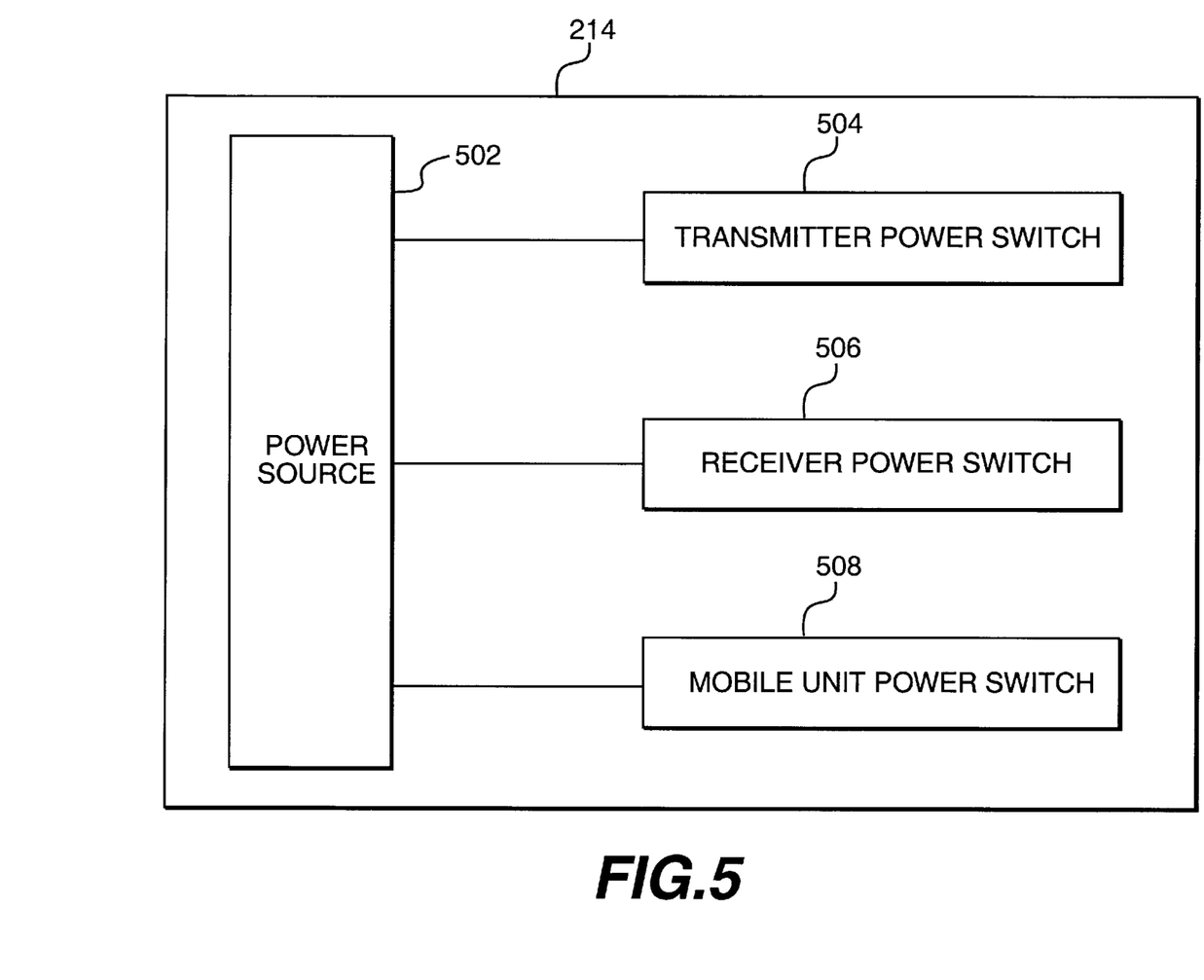
FIG. 5 illustrates a block diagram of a power module of the mobile unit shown in FIG. 2, in accordance with a preferred embodiment of the present invention.

FIG. 5 shows a block diagram of power module 214, in accordance with a preferred embodiment of the present invention. Power module 214 includes power source 502, transmitter power switch 504, receiver power switch 506, and mobile unit power switch 508. Power source 502 is preferably any source, such as a battery, capable of supplying the power required by mobile unit 200.

Transmitter power switch 504 preferably allows a subscriber to turn on or off transmitter 202 of mobile unit 200. Receiver power switch 506 preferably allows a subscriber to turn on or off receiver 204 of mobile unit 200. Mobile unit power switch 508 preferably allows a subscriber to turn on or off the entire mobile unit 200 including transmitter 202, receiver 204, and display 206.

There may be occasions when a subscriber wishes to turn off only transmitter 202 or only receiver 204 to conserve power. For example, when mobile unit 200 is in flight on a aircraft, base receivers on the ground may be out of range of transmitter 202 or regulations may prohibit transmissions from the aircraft. In this situation, a subscriber may simply choose to turn off transmitter 202 to conserve battery power, while leaving receiver 204 on to receive probe messages so the subscriber can be notified of message delivery attempts by network operations center 100.

Figure 6:
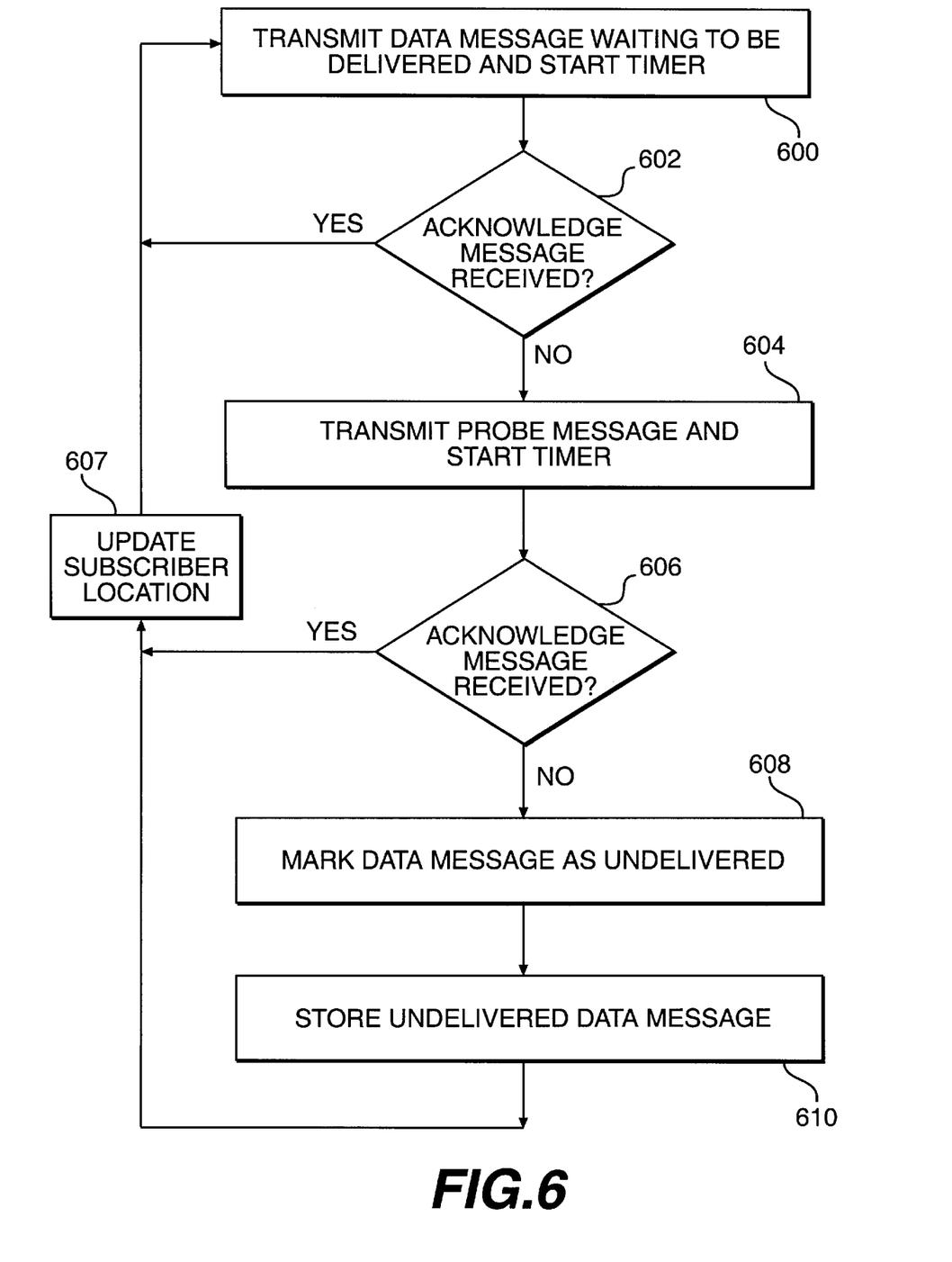
FIG. 6 illustrates a flow diagram of a method of delivering a data message and processing an undeliverable data message, in accordance with a preferred embodiment of the present invention.

FIG. 6 shows a flow diagram depicting the operation of network operations center 100 in attempting data message delivery and processing undelivered data messages, in accordance with a preferred embodiment of the present invention. The process starts when network operations center 100 transmits a current data message through message transmitting unit 108 to the last known location of a corresponding mobile unit and DMP module 304 starts timer 316 for receiving a data acknowledgment message as described above (step 600). MTD module 302 then checks incoming messages to identify a data acknowledgment message from the corresponding mobile unit (step 602). If a data acknowledgment message is received before timer 316 expires, then network operations center 100 repeats steps 600 and 602 to transmit the next data message waiting to be delivered.

If no data acknowledgment message is received before timer 316 expires, then DMP module 304 requests PMG module 312 to generate a probe message. This scenario can arise, for example, when the subscriber is in flight on a airplane, and the corresponding mobile unit has changed location since its last location update to the network operations center. PMG module 312 transmits a probe message through message transmitting unit 108 to the corresponding mobile unit and starts timer 316 for receiving a probe acknowledgment message as described above (step 604). MTD module 302 then checks incoming messages to identify a probe acknowledgment message from the corresponding mobile unit (step 606). If a probe acknowledgment message is received before timer 316 expires, then AMP module 310 updates in memory storage unit 110 the location of the corresponding mobile unit (step 607), and network operations center 100 repeats steps 600, 602, 604, and 606 to re-transmit the last data message.

If no probe acknowledgment message is received before timer 316 expires, then PMG module 312 requests UDMP module 314 to mark the last data message transmitted as undelivered. Again, this scenario can arise when, for example, the subscriber is in flight on an airplane and the transmitter of the corresponding mobile unit is powered off because regulations prohibit transmissions from the airplane. UDMP module 314 then marks the message as undelivered (step 608) and stores it in memory storage unit 110 for future delivery (step 610).

It is possible that the corresponding mobile unit will acknowledge a probe message but not a data message sent from the network operations center because the transmission range or strategy for a probe message may differ from that of a data message, as described in the incorporated U.S. patent application Ser. No. 08/124,219. For example, a data message may be transmitted by the network operations center only to the last known location of the corresponding mobile unit. Therefore, if the mobile unit has moved, it may miss the data message. On the other hand, a probe message is preferably broadcast by the network operations center to all locations covered by all base transmitters, so there is a very high likelihood that it will reach the corresponding mobile unit even if the mobile unit has moved.

Figure 7:
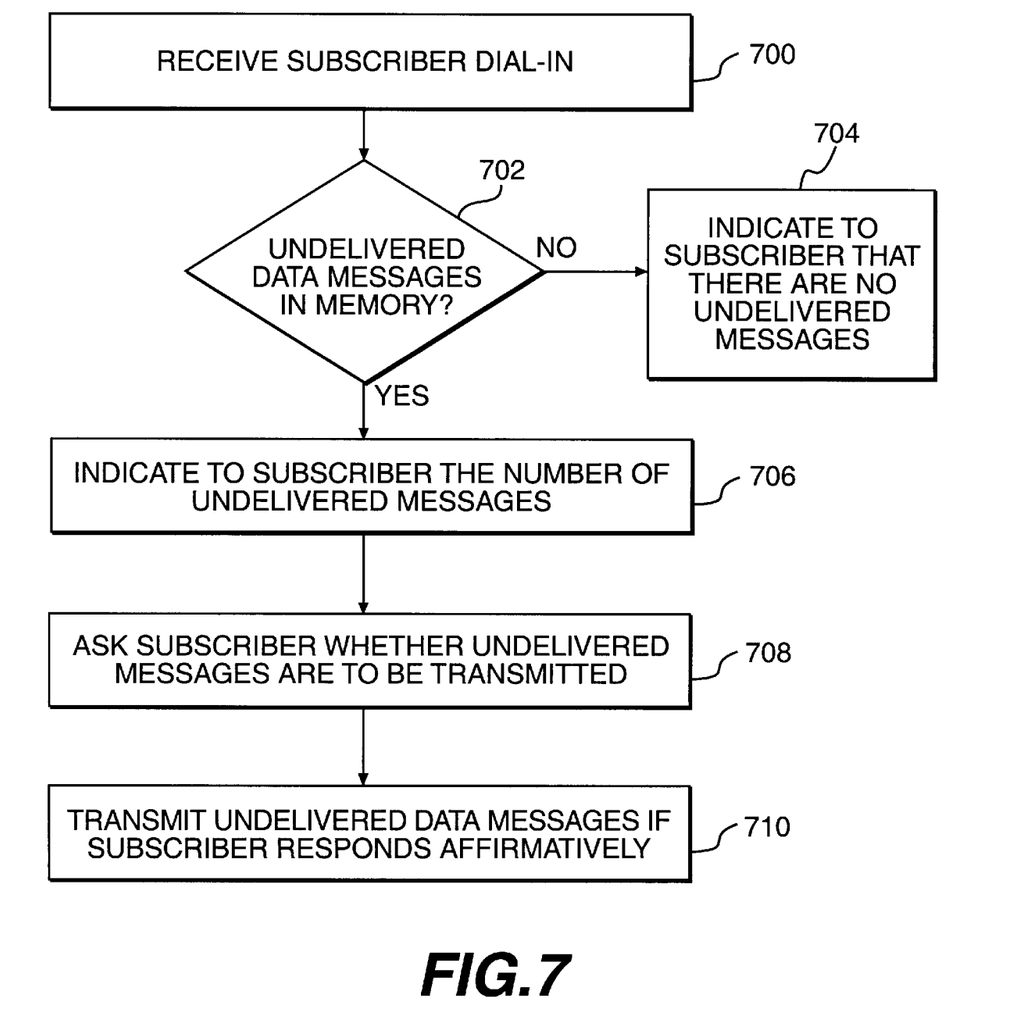
FIG. 7 illustrates a flow diagram of a method of transmitting undelivered data messages upon subscriber dial-in, in accordance with a preferred embodiment of the present invention.

FIG. 7 shows a flow diagram depicting a method of transmitting undelivered data messages when a subscriber dials-in to network operations center 100, in accordance with a preferred embodiment of the present invention. The process starts when network operations center 100 receives subscriber dial-in through dial-in access (DA) unit 102 (step 700). For example, when a subscriber traveling on an airplane lands, he may dial-in to the network operations center to check whether there are any undelivered messages for him. In response to a prompt (e.g., a voice prompt) from network operations center 100, the subscriber indicates that he wishes to check for undelivered messages. DA unit 102 checks memory storage unit 110 to determined whether there exists any undelivered data messages for that subscriber (step 702). If not, then DA unit 102 indicates to the subscriber that currently there are no undelivered messages (step 704). If there are undelivered data messages, then DA unit 102 preferably indicates to the subscriber the number of such messages (step 706) and inquires whether the subscriber wishes to receive them (step 708). If the subscriber responds affirmatively, then message transmitting unit 108 re-transmits the undelivered data messages (step 710).

Figure 8:
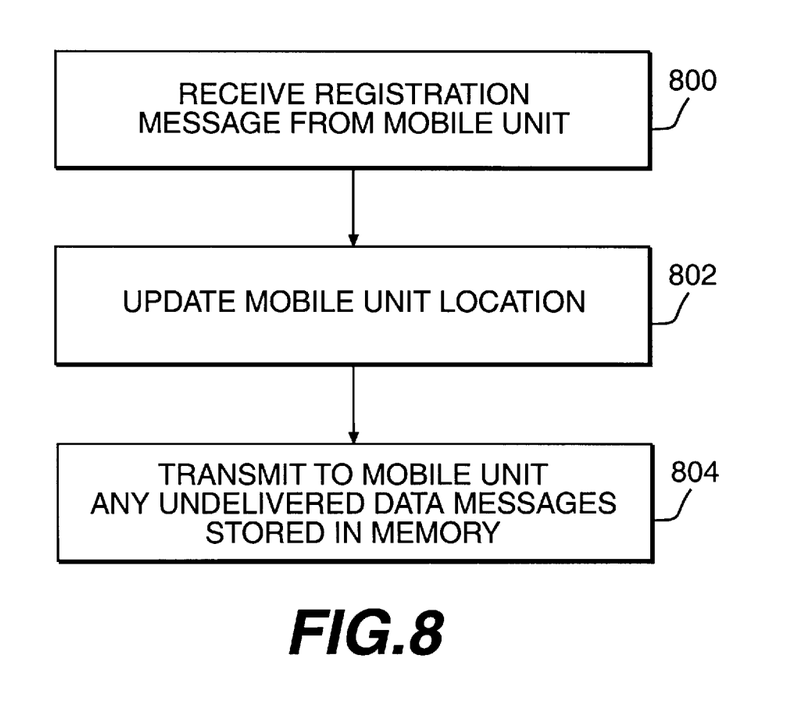
FIG. 8 illustrates a flow diagram of a method of transmitting undelivered data messages upon mobile unit registration, in accordance with a preferred embodiment of the present invention.

FIG. 8 shows a flow diagram depicting a method of transmitting undelivered data messages upon mobile unit registration, in accordance with a preferred embodiment of the present invention. The process starts when network operations center 100 receives through message receiving unit 104 an incoming message which MTD module 302 determines to be a registration message (step 800). A registration message may be sent by a mobile unit upon power restoration to the transmitter of the mobile unit if a probe message has been received when the transmitter is powered off. RMP module 306 then updates in memory storage unit 110 the location of the corresponding mobile unit as described above (step 802) and transmits through message transmitting unit 108 any undelivered data messages stored in memory storage unit 110 (step 804).

Figure 9:
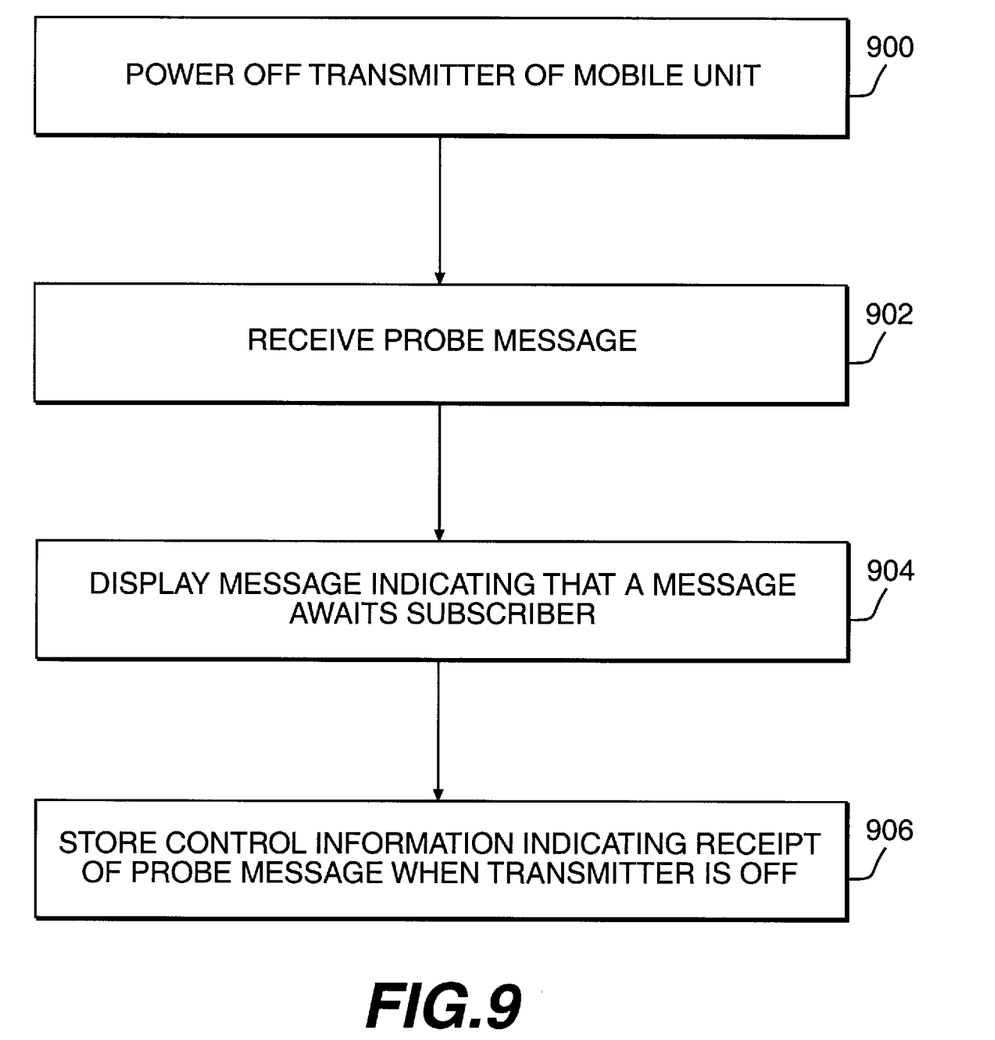
FIG. 9 illustrates a flow diagram of a method of notifying a subscriber that a message awaits, in accordance with a preferred embodiment of the present invention.

FIG. 9 shows a flow diagram depicting the operation of mobile unit 200 in receiving a probe message while its transmitter is powered off, in accordance with a preferred embodiment of the present invention. Transmitter 202 is turned off by a subscriber, as described, for example, to conserve power when the subscriber is in flight on an airplane and regulations prohibit mobile unit transmission from the airplane (step 900). While transmitter 202 is off, receiver 204 receives an incoming message which MTD module 408 determines to be a probe message as described above (step 902). Mobile unit 200 cannot acknowledge receipt of the probe message because transmitter 202 is off. PMP module 410 then indicates to the subscriber through display 206 that there is a message waiting to be delivered from network operations center 100 (step 904). The subscriber can choose to dial-in to the network operations center to retrieve the message from the airplane or when he lands. PMP module 410 also stores in memory 212 control information indicating that mobile unit 200 has received a probe message when transmitter 202 is powered off (step 906).

Figure 10:
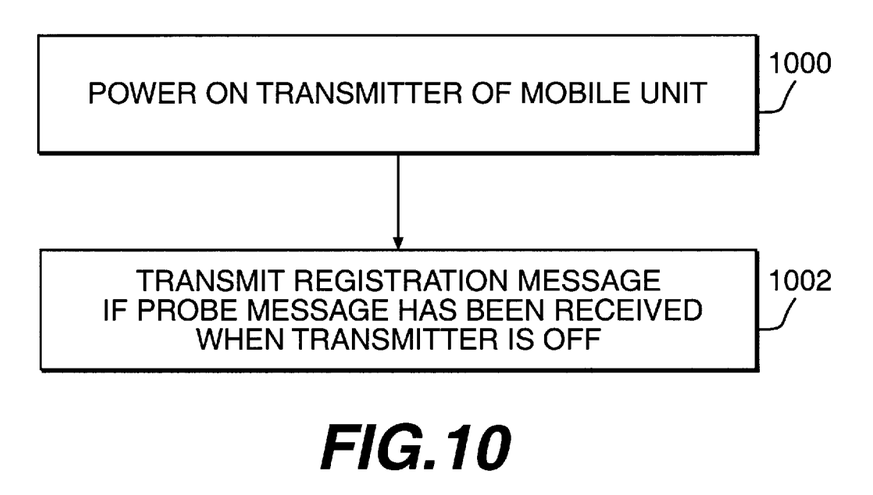
FIG. 10 illustrates a flow diagram of a method of mobile unit registration, in accordance with a preferred embodiment of the present invention.

FIG. 10 shows a flow diagram depicting the operation of mobile unit 200 in registering upon power restoration to transmitter 202, in accordance with a preferred embodiment of the present invention. Transmitter 202 is turned back on, for example, when a subscriber traveling on an airplane lands (step 1000), RMG module 404 checks memory 212 for control information indicating that mobile unit 200 has received a probe message when transmitter 202 is off. If such an indication exits, then RMG module 404 sends a registration message through transmitter 202 to network operations center 100 to update the current location of mobile unit 200 (step 1002).

It will be apparent to those skilled in the art that various modifications and variations can be made in the methods and devices of the present invention without departing from the spirit or scope of the invention. Thus, it is intended that the present invention cover the modifications and variations of this invention provided they come within the scope of the appended claims and their equivalents.

What is claimed is:

1. A network operations center for transmitting and receiving messages to and from a wireless mobile unit comprising:

means for transmitting messages to the mobile unit;

means for receiving acknowledgment messages from the mobile unit;

means for determining whether an acknowledgment message is an acknowledgment to a data message or an acknowledgment to a probe message;

means for transmitting a probe message to the mobile unit if, after transmitting a data message to the mobile unit, no data acknowledgment message is received; and means for marking a data message as undelivered and storing the undelivered data message if, after transmitting a probe message to the mobile unit, no probe acknowledgment message is received.

2. The network operations center according to claim 1, further comprising:

means for receiving registration messages from the mobile unit; and means for automatically transmitting undelivered data messages to the mobile unit upon receiving a registration message from the mobile unit.

3. The network operations center according to claim 1, further comprising means for allowing dial-in access to undelivered data messages by a subscriber to retrieve the undelivered data messages.

4. A wireless mobile unit for receiving and transmitting messages from and to a network operations center comprising:

means for receiving data and probe messages from the network operations center;

a transmitter;

means for generating, upon receiving a data message, a data acknowledgment message, said data acknowledgment message being transmitted by said transmitter;

means for generating, upon receiving a probe message, a probe acknowledgment message, said probe acknowledgment message being transmitted by said transmitter;

means for powering the transmitter on and off;

means for determining whether a probe message has been received while said transmitter was powered off; and means for generating, upon power restoration to the transmitter, a registration message if a probe message has been received while the transmitter was powered off, said registration message being transmitted by said transmitter.

5. The mobile unit according to claim 4, further comprising means for displaying, upon receipt of a probe message when said transmitter is powered off, an indication that the network operations center has attempted message delivery.

6. The mobile unit according to claim 4, further comprising a key pad for entering subscriber commands.

7. The mobile unit according to claim 4, further comprising means for storing information indicating that a probe message has been received when the transmitter of the mobile unit is powered off.

8. In a two-way wireless communications system, a method of processing data messages that cannot be successfully transmitted from a network operations center to a wireless mobile unit comprising the steps of:

(a) transmitting a data message from the network operations center to the mobile unit;

(b) receiving at the network operations center a data acknowledgment message from the mobile unit acknowledging receipt of the data message sent by the network operations center;

(c) transmitting a probe message from the network operations center to the mobile unit if, after transmitting a data message to the mobile unit, no data acknowledgment message is received at the network operations center;

(d) marking at the network operations center a data message as undelivered if, after transmitting a probe message to the mobile unit, no probe acknowledgment message is received at the network operations center; and (e) storing at the network operations center the undelivered data message.

9. A method according to claim 8, further comprising the step of transmitting undelivered data messages from the network operations center to the mobile unit upon receiving at the network operations center a registration message from the mobile unit.

10. A method according to claim 8, wherein a subscriber has dial-in access to the undelivered data messages stored at the network operations center to retrieve those data messages.

* * * * *